United States Patent [19]

Sakamoto et al.

[11] Patent Number: 5,124,415
[45] Date of Patent: Jun. 23, 1992

[54] METHOD OF PREPARING POLYPHENYLENE OXIDE COMPOSITION AND LAMINATES USING SUCH COMPOSITIONS

[75] Inventors: Takaaki Sakamoto, Yawata; Munehiko Itoh, Kobe; Shuji Maeda, Yawata; Tetsuya Takanaga, Moriguchi, all of Japan

[73] Assignee: Matsushita Electric Works, Ltd., Osaka, Japan

[21] Appl. No.: 379,281

[22] Filed: Jul. 13, 1989

Related U.S. Application Data

[63] Continuation of Ser. No. 157,936, Feb. 19, 1988, Pat. No. 4,874,826, which is a continuation-in-part of Ser. No. 99,071, Sep. 21, 1987, abandoned, which is a continuation of Ser. No. 840,753, Nov. 18, 1986, abandoned.

[30] Foreign Application Priority Data

| Mar. 25, 1985 | [JP] | Japan | 60-61542 |
| Mar. 25, 1985 | [JP] | Japan | 60-61543 |
| Mar. 25, 1985 | [JP] | Japan | 60-61544 |
| Mar. 25, 1985 | [JP] | Japan | 60-61545 |
| Mar. 25, 1985 | [JP] | Japan | 60-61546 |
| Mar. 25, 1985 | [JP] | Japan | 60-61547 |
| Mar. 25, 1985 | [JP] | Japan | 60-61548 |
| Jun. 15, 1985 | [JP] | Japan | 60-130158 |

[51] Int. Cl.⁵ .................... C08F 283/08; C08G 75/00; C08L 71/12
[52] U.S. Cl. ................. 525/535; 525/132; 525/133; 525/905
[58] Field of Search ............. 525/534, 535, 132, 133, 525/905, 147

[56] References Cited

U.S. PATENT DOCUMENTS

| 3,557,045 | 1/1971 | Wright et al. | 524/508 |
| 4,238,584 | 12/1980 | White | 525/534 |
| 4,283,503 | 8/1981 | Wright | 525/132 |
| 4,322,506 | 3/1982 | Rollmann | 525/92 |
| 4,388,444 | 6/1983 | Irvin | 525/92 |

FOREIGN PATENT DOCUMENTS 1274050 12/1969 United Kingdom.

Primary Examiner—John Kight, III
Assistant Examiner—P. Hampton-Hightower
Attorney, Agent, or Firm—Burns, Doane, Swecker & Mathis

[57] ABSTRACT

A method of preparing a film-forming polyphenylene oxide (PPO) composition as well as a laminate using such composition, wherein a setting means selected from the group consisting of a crosslinking monomer, a crosslinking polymer, and mixtures thereof, and, optionally, an initiator are added to and mixed with PPO, and a sufficient film-forming property is provided to PPO by allowing the setting means and, if present, the initiator to crosslink, whereby the PPO composition has the ability to form a film. Further, when a plurality of such films are stacked and integrated to form a metal-clad laminate, the laminate exhibits low dielectric constant and loss, so as to be used effectively in superhigh frequency bands such as the X band used for satellite communication.

62 Claims, 2 Drawing Sheets

METHOD OF PREPARING POLYPHENYLENE OXIDE COMPOSITION AND LAMINATES USING SUCH COMPOSITIONS

This application is a continuation of application Ser. No. 07/157,936, filed Feb. 9, 1988, now U.S. Pat. No. 4,824,826, continuation in part of 07/099,071 filed Sep. 21, 1987, abandoned which is a continuation of Ser. No. 06/840,753 filed Nov. 18, 1986 abandoned.

TECHNICAL BACKGROUND OF THE INVENTION

This invention relates to methods of preparing polyphenylene oxide compositions as well as laminates, in particular, metal-clad laminates that use such compositions.

The present polyphenylene oxide compositions should be in the form of film members. A plurality these film members are stacked and integralized into the metal-clad laminate with either or both of an overlaying and interpositions of metal foil or foils that form the desired electric circuit or circuits. Because the obtained laminate is excellent in high frequency characteristic, particularly in the dielectric characteristics, they find an effective utility in use with such super high frequency bands as, for example, the X-band of 10 GHz used in satellite communication or the like.

DISCLOSURE OF PRIOR ART

In general, for laminate materials to be effectively used in the superhigh frequency band for satellite communication or the like, the laminate materials must be excellent in the dielectric constant and dielectric loss at least in respect to the environmental resistance, and preferably low in the dielectric constant and loss, so as to achieve the desired high dielectric characteristics. To this end, poly-4-fluoroethylene, crosslinked polyethylene and alumina ceramics have been used as the materials for such laminates. However, poly-4-fluoroethylene and crosslinked polyethylene have proven to be defective in that they both have low glass-transition points and are likely to vary remarkably in the dielectric constant and loss when used in conjunction with high frequency bands. Alumina ceramics have also exhibited drawbacks. Thus, while its dielectric constant and loss are known to be relatively constant, its workability is poor, specifically when used for preparing the metal-clad laminate. Also, no simple and favorable process has been found for forming the electric circuits with, for example, a copper foil and the alumina ceramics.

As for other materials which are constant in the dielectric constant and loss, i.e., materials low in the dielectric constant and relatively high in the glass-transition point, there can be enumerated polyether sulfone, polyetherimide, polysulfone and the like which are considered to be suitable, in their normal state, for adhering to the metal foil for the circuit arrangement. However, their thermoplasticity creates problems that arise upon wiring connections with respect to the metal foil circuit by mean of a soldering, the heat of which causes a deterioration in their adhesion.

It has been proposed in U.S. Pat. No. 4,059,568 to use polyphenylene oxide (hereinafter referred to as "PPO") which has a high glass-transition point and is known to yield excellent results, particularly when used in laminate materials to be utilized with superhigh frequency bands. However, the thermoplasticity of PPO still leaves the problem of the poor heat resistance unsolved. In this case, an optimum and reliable measure for improving the heat resistance of PPO would be to have it crosslinked, but it is impossible to crosslink PPO by a simple crosslinking process, such as the application of heat that is effective with thermosetting resins.

It may be possible to provide a required heat resistance to PPO by blending PPO with a thermosetting resin. However, this causes a problem to arise in that, when the blending is carried out by means of melt extrusion, the inherently required high temperature melting results in a gelation of the resin so as to render its further processing difficult. Also, the blending of the thermosetting resin with PPO may deteriorate the dielectric characteristics and eventually the high frequency characteristic of PPO. Further, while calendering may be employed to obtain sheet materials of a PPO composition that contains a thermosetting resin so as to form the metal-clad laminate with such sheet materials and the metal foil or foils properly stacked, such calendering creates a gelation problem similar to that caused by the melt extrusion.

Of course, if PPO could be processed into films by means of solvent-casting, such processing would be preferable because the casting could be performed at a lower temperature. However, the film casting of PPO alone has been difficult and, thus, it has been attempted to render PPO adaptable to simple and inexpensive casting processing by means of adding a crosslinking agent so as to obtain films of the PPO composition.

Thus, K. Kariya et al. have suggested in Japanese Patent Application Laid-Open Publication No. 59-193,929 a method in which 1,2-polybutadiene is added to and mixed with PPO. A substrate consisting of fiberglass or the like is impregnated with this mixture and subjected to thermodrying. This renders the mixture to be in an intermediate or prepreg in B-stage. A plurality of such prepregs are stacked and pressed into a laminate. However, in this case the substrate itself is poor in the dielectric characteristics because of the use of the fiber glass or the like so that, notwithstanding the high dielectric characteristics of PPO, the eventually obtained laminate cannot maintain the desired high dielectric characteristics and is unsuitable for use in such superhigh frequency bands as the X band.

TECHNICAL FIELD OF THE INVENTION

A primary object of the present invention is, therefore, to provide a method of preparing polyphenylene oxide (PPO) compositions which can be formed into any required types of films in a lower temperature atmosphere so as to lower the production costs. Such a film is effectively used in forming the metal-clad laminates suitable for use in the superhigh frequency band.

According to the present invention, this object can be realized by providing a method of preparing a PPO composition, wherein a setting means containing at least one polyfunctional component, for example, selected from the group consisting of a crosslinking monomer, a crosslinking polymer, and mixtures thereof, and, optionally, an initiator are added to and mixed with PPO, and a sufficient film-forming property is provided to PPO by allowing e.g., the setting means and, if present, the initiator to crosslink, whereby a film-forming property is provided to PPO.

The "PPO composition" should not be limited to be the only one for forming the film, and the term "composition" herein used is to mean the composition in a state different from that of any finally hardened or cured resin material, including an intermediate setting state between A and C stages, such as the state of prepreg in B stage where any subsequent physical processing can be carried out.

Other objects and advantages of the present invention shall become clear from the following description of the invention detailed with reference to preferred examples of the invention.

While the present invention shall now be described with reference to the preferred examples, it should be understood that the intention is not to limit the invention only to the particular examples but rather to cover all alterations, modifications, and equivalent methods possible within the scope of appended claims.

DISCLOSURE OF PREFERRED EMBODIMENTS

According to a first feature of the present invention, styrene copolymer (hereinafter referred to as "STP") and polybutadiene (hereinafter referred to as "PB") are added to and mixed with PPO to provide thereto a film-forming property and obtain a PPO composition in the form of a film.

As used herein, PPO is a resin of the following general structural formula,

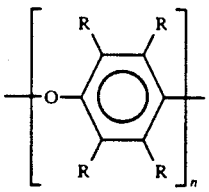

where R is a hydrocarbon radical having hydrogen or carbon of 1 to 3 in number and the respective R's may be all the same or different. For example, PPO may be poly-(2,6-dimethyl-1,4-phenylene oxide) having preferably a weight-average molecular weight (Mw) of 50,000 and a molecular-weight distribution (Mw/Mn) of 4.2 (Mn being a number-average molecular weight).

Desirably used as STP is styrene-butadiene-block copolymer, styrene-isoprene-block copolymer or the like. The polymer state should desirably be of a high molecular weight. The block state may be, assuming that A and B represent polystyrene and polybutadiene (or polyisoprene), respectively, any of AB, ABA, ABAB and so on. PB is preferably, for example, one or a mixture of at least two of 1,2-polybutadiene, 1,4-polybutadiene, maleic-, acrylic- or epoxy-modified 1,2-polybutadiene and the like. PPO, STP, and PB may, of course, be of any other structure and need not be restricted to the foregoing ones.

Figure 1:
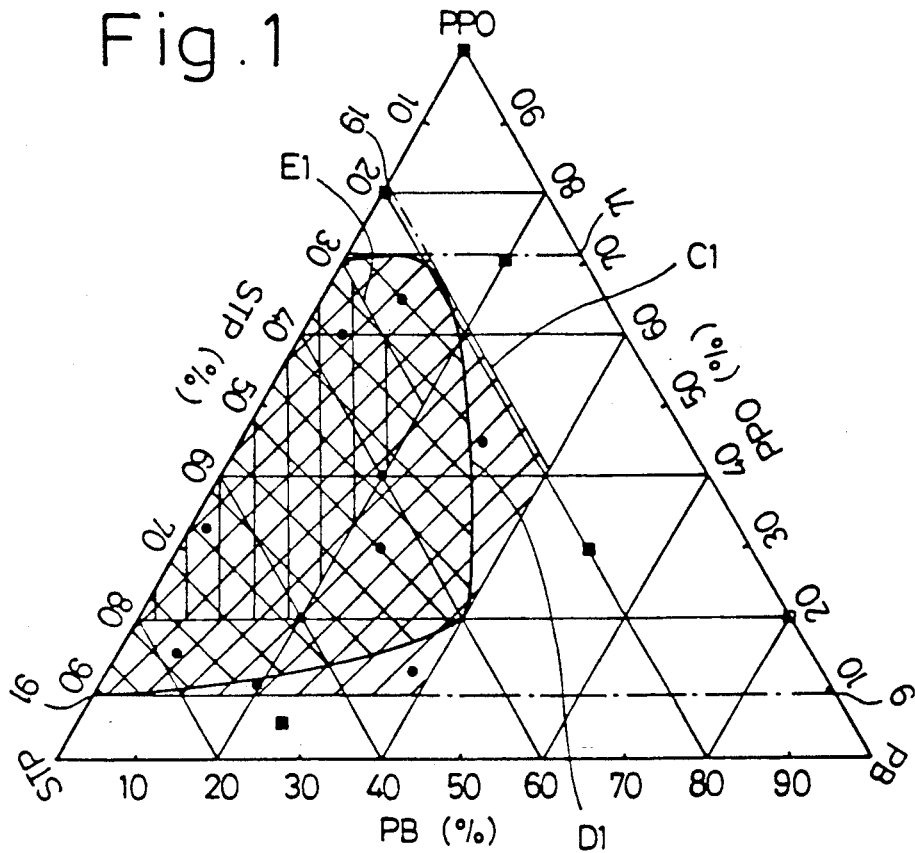
FIG. 1 shows in a triangular diagram the composition ratios of PPO, styrene-containing and thermoplastic copolymer with unsaturated double bond (STP) and polybutadiene (PB) employed in EXAMPLES 1 to 10 and in their COMPARATIVE EXAMPLES, the respective components being taken on each of three sides of the diagram.

It has been found that when PPO is present in an amount from 9 to 71 weight %, STP is present in an amount from above 19 and below 91 weight % and PB is present in an amount from below 40 weight %, a PPO composition in the form of a favorable film can be obtained. Referring now to the triangular diagram of FIG. 1 showing the composition ratios of PPO, STP and PB which are taken respectively on each of three sides of the diagram, zone C1, shaded with rightward upward hatches, denotes the area in which favorable PPO compositions are obtained; within zone D1, shown within the zone C1 as shaded with leftward upward hatches, more preferred PPO compositions are obtained, and within zone E1, shown within the zone D1 as shaded with vertical hatches, in which PPO is present in an amount above 20 and below 70 weight %, STP is present in an amount above 30 and below 80 weight %, and PB is present in an amount below 20 weight %, a substantially optimum PPO composition is obtained.

While the foregoing three component resins are usually mixed as dissolved in a solvent, it has been found preferable that the solid resin content be in a range of 10 to 30 weight %. As the solvent, one or a mixture of at least two of such halogenated hydrocarbons as trichloroethylene (Trichlene), trichloroethane, chloroform, methylene chloride and the like, such aromatic hydrocarbon as benzene, chlorobenzene, toluene, xylene and the like, carbon tetrachloride and the like may be used, but it is preferable to employ trichloroethylene alone or in a mixture thereof with other solvent.

In obtaining the PPO composition in the form of a film, it is preferred to employ a solvent-mold casting. More specifically, the mixture solution of PPO, STP and PB in the solvent is cast to be, for example, 5 to 700 μm thick on a planished iron plate, a casting carrier film or the like. When the casting carrier film is employed, such a resin film that is insoluble to the solvent such as polyethylene terephthalate (hereinafter referred to as "PET"), polyethylene, polypropylene, polyimide or the like can be used. Then, the cast solution is subjected to air-drying and/or hot air processing to remove the solvent from the solution. It is preferable that the drying temperature range be set to be lower at its upper limit than the boiling temperature of the solvent or, in the case of drying as left on the carrier film, lower than the heat-resistant temperature of the carrier film, while the lower limit is set taking into consideration the necessary drying time or the desired ease of processing. When, for example, trichlorethylene (hereinafter referred to as "TCE") and PET film are used, respectively, as the solvent and carrier film, the drying temperature range is set to be higher than a room temperature but lower than 80° C. The higher the drying temperature within this drying temperature range, the shorter the drying time.

The term "film" herein used as the PPO composition should be interpreted in the broad sense and thus should include sheet, film, tape, layer, web or any equivalent thereto. The surface area or length perpendicular to the thickness direction of such products should not be restricted, and the thickness may be suitably set as required depending on the intended use.

EXAMPLE 1

In a reactor having a defoamer and of a capacity of 2 liters, 80 g of PPO, 80 g of styrene-butadiene-block copolymer as STP, 40 g of PB and then 800 g of TCE were added and sufficiently stirred to mix them until a homogeneous solution was obtained. The solution was thereafter defoamed and then applied onto a PET casting film to form thereon a film of 500 μm thick. In this state, the thus formed film was subjected to air-drying and then to drying with blown air heated to 50° C., after which the dried film was released from the PET film and further dried for 30 minutes under a heat of 120° C. As a result, the PPO composition film thus obtained was of a thickness of about 100 μm.

EXAMPLES 2 to 10

Different PPO compositions were obtained through the same steps as in EXAMPLE 1 but with the composition ratios of PPO, STP and PB as shown in TABLE 1.

COMPARATIVE EXAMPLES 1 to 6

The ratios of PPO, STP and PB were varied as also shown in TABLE 1, solutions were prepared, and an attempt was made to obtain films through the same steps as in EXAMPLE 1.

ATIVE EXAMPLES which are outside zone C1 produce no film.

According to a second feature of the present invention, PPO, polystyrene (hereinafter referred to as "PS"), triallyl isocyanurate (hereinafter referred to as "TAIC") and/or triallyl cyanurate (hereinafter referred to as "TAC") are mixed to provide a film-forming property and obtain a PPO composition. PPO has the same structure as that used in the foregoing EXAMPLES 1 to 10. PS should preferably be the one of a high molecular weight for the purpose of improving the film-forming property. Further, while TAIC and TAC are respectively an isomer, from the viewpoint of chemical structure, it has been known that they have substantially the same film-forming property, compatibility, solubility and reactivity, and either one or both of them may be used.

Figure 2:
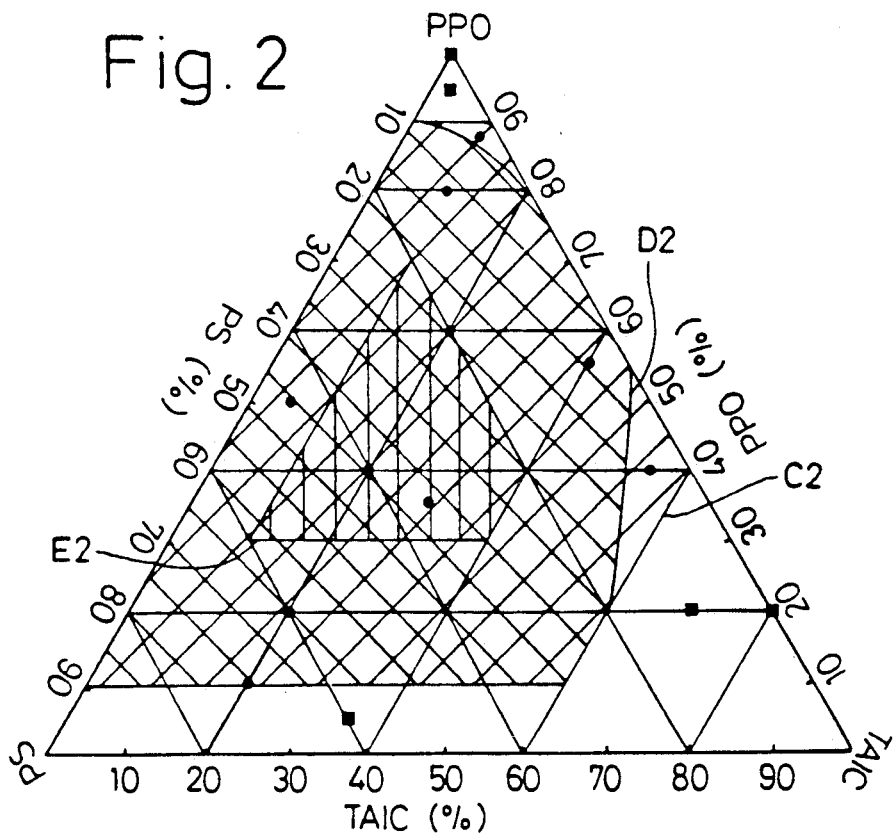
FIG. 2 shows in a triangular diagram the composition ratios of PPO, styrene copolymer (STP) and triallyl isocyanurate (TAIC) employed in EXAMPLES 11 to 20 and in their COMPARATIVE EXAMPLES, which components being taken respectively on each of three sides of the diagram.

Referring next to FIG. 2 showing composition ratios of PPO, PS and TAIC in a triangular diagram, the three components being taken respectively on each of three sides of the triangle, it is seen that favorable PPO compositions can be obtained in a zone C2 shaded by rightward upward hatches. That is, when the PPO is present in an amount from 10 to 90 weight PS is present in an amount less than 90 weight % and TAIC (and/or TAC) is present in an amount below 60 weight % favorable results are obtained. Further, in a zone D2, located within the zone C2 and shaded with leftward upward hatches, more preferred PPO compositions can be obtained. In addition, in a zone E2, located within the zone D2 and shaded by vertical hatches, where PPO is present in an amount from 30 to 70 weight %, PS is present in an amount from 20 to 60 weight % and TAIC (and-/or TAC) is present in an amount from 10 to 40 weight

TABLE 1

|  | EXAMPLES | | | | | | | | | | COMPARATIVE EXAMPLES | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 | 6 |
| 1) PPO (g) | 80 | 40 | 120 | 65 | 130 | 60 | 30 | 90 | 25 | 20 | 200 | 40 | 10 | 140 | 60 | 160 |
| 2) STP (g) | 80 | 120 | 70 | 130 | 50 | 90 | 155 | 50 | 100 | 140 | 0 | 0 | 140 | 20 | 40 | 40 |
| 3) PB (g) | 40 | 40 | 10 | 20 | 20 | 50 | 15 | 60 | 75 | 40 | 0 | 160 | 50 | 40 | 100 | 0 |

The obtained compositions were observed and tested in respect to the presence or absence of film-forming property, homogeneity, surface tackiness and tensile strength. The results are shown in TABLE 2 below, in which "X" indicates excellent state while hyphen "-" indicates an unmeasurable state.

%, substantially optimum PPO compositions particularly in the form of films can be obtained.

In mixing PPO, PS and TAIC (and/or TAC), the same solvent as explained in connection with the first feature can be used, and their resultant solutions can be processed into films substantially through the same

TABLE 2

|  | EXAMPLES | | | | | | | | | | COMPARATIVE EXAMPLES | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 | 6 |
| 1) Film-form. prop. | X | X | X | X | X | X | X | X | X | X | no | no | no | no | no | no |
| 2) Homogeneity | X | X | X | X | X | X | X | X | X | X | — | — | — | — | — | — |
| 3) Surface tack. | X | X | X | X | X | X | X | X | X | X | — | — | — | — | — | — |
| 4) Tensile streng. (Kgf/cm$^2$) | 350 | 300 | 400 | 350 | 400 | 350 | 250 | 300 | 200 | 200 | — | — | — | — | — | — |

Referring also to FIG. 1 in which circular the composition ratios of EXAMPLES 1 to 10 and square dots represent those of COMPARATIVE EXAMPLES 1 to 6, it will be seen that the composition ratios of PPO, STP and PB used in EXAMPLES 1 to 10 reach favorable results, while the composition ratios of COMPARsteps as those of the casting explained in connection with the first feature.

EXAMPLE 11

120 g of PPO, 40 g of PS, 40 g of TAIC, and 800 g of TCE as solvent were put in a reactor having defoamer and of a capacity of 2 liters, and sufficiently stirred and mixed until a homogeneous solution was obtained. The solution was applied onto a PET casting film to be a film of 500 μm thick, by means of a coater. The film in this state was subjected to air-drying and further dried under a heat of 50° C. After the drying the film formed on the PET casting film was released therefrom and then heated at 120° C. to be dried for 30 minutes. The obtained PPO composition film had a thickness of about 100 μm.

EXAMPLES 12 to 21

The composition ratio of PPO, PS and TAIC was variously changed as shown in the following TABLE 3, and PPO composition films were obtained through the same steps as in EXAMPLE 11.

COMPARATIVE EXAMPLES 7 to 11

The composition ratio of PPO, PS and TAIC was further changed as shown also in TABLE 3, to prepare different solutions, and an attempt was made to obtain films through the same steps as in EXAMPLE 11.

Referring next to the triangular diagram of FIG. 3 of various composition ratios of PPO, STP and TAIC respectively taken on each side of the system, favorable PPO compositions can be obtained in a zone C3, shaded with rightward upward hatches, in which PPO is present in an amount above 7 and below 93 weight %, STP is present in an amount above 7 and below 93 weight %, and TAIC (and/or TAC) is present in an amount below 70 weight %, more preferred PPO compositions can be obtained in a zone D3, located within the zone C3 and shaded with leftward upward hatches, and most preferred PPO compositions can be obtained in a zone E3, located inside the zone D3 and shaded with vertical hatches, wherein PPO is present in an amount above 10 and below 80 weight %, STP is present in an amount from 20 to 80 weight % and TAIC (and/or TAC) is present in a amount below 60 weight %.

The solvent used in mixing the three of PPO, STP and TAIC (and/or TAC) may be the same as that explained in connection with the first feature, and the film formation can be performed by means of substantially

TABLE 3

| | EXAMPLES | | | | | | | | | | | COMPARATIVE EXAMPLES | | | | |
|---|---|---|---|---|---|---|---|---|---|---|---|---|---|---|---|---|
| | 11 | 12 | 13 | 14 | 15 | 16 | 17 | 18 | 19 | 20 | 21 | 7 | 8 | 9 | 10 | 11 |
| 1) PPO(g) | 120 | 80 | 70 | 20 | 40 | 60 | 100 | 160 | 110 | 80 | 175 | 200 | 40 | 190 | 40 | 10 |
| 2) PS(g) | 40 | 80 | 70 | 140 | 120 | 40 | 90 | 20 | 10 | 10 | 5 | 0 | 0 | 5 | 20 | 120 |
| 3) TAIC(g) | 40 | 40 | 60 | 40 | 40 | 100 | 10 | 20 | 80 | 110 | 20 | 0 | 160 | 5 | 140 | 70 |

The obtained compositions were observed and tested in respect to the presence or absence of the film-forming property, homogeneity, surface tackiness and tensile strength, results of which are given in TABLE 4 below. In the Table, the mark "X" indicates excellent and hyphen "-" indicates unmeasurable.

the same casting process as explained also in connection with the first feature.

EXAMPLE 22

In a reactor having a defoamer and of a capacity of 2 liters, a solution of 110 g of PPO, 80g of styrene-butadi-

TABLE 4

| | EXAMPLES | | | | | | | | | | | COMPARATIVE EXAMPLES | | | | |
|---|---|---|---|---|---|---|---|---|---|---|---|---|---|---|---|---|
| | 11 | 12 | 13 | 14 | 15 | 16 | 17 | 18 | 19 | 20 | 21 | 7 | 8 | 9 | 10 | 11 |
| 1) Film-form. prop. | X | X | X | X | X | X | X | X | X | X | X | no | no | no | no | no |
| 2) Homogeneity | X | X | X | X | X | X | X | X | X | X | X | — | — | — | — | X |
| 3) Surface tack. | X | X | X | X | X | X | X | X | X | X | X | — | — | — | — | no |
| 4) Tensile streng. (Kgf/cm²) | 500 | 500 | 450 | 250 | 350 | 300 | 450 | 300 | 200 | 150 | 250 | — | — | — | — | — |

As will be clear in view from FIG. 2, wherein circular dots represent the composition ratios of EXAMPLES 11 to 21 and square dots represent those of COMPARATIVE EXAMPLES 7 to 11, it has been found that the composition ratios of PPO, PS and TAIC used in EXAMPLES 11 to 21 reach favorable results, while the composition ratios of COMPARATIVE EXAMPLES which are outside the zone C2 in FIG. 2 do not provide any favorable composition films.

According to a third feature of the present invention, PPO, STP and TAIC (and/or TAC) were mixed to provide a film-forming property and obtain a PPO composition. The same PPO and STP as those in the foregoing EXAMPLES 1 to 10 can be used, and the same TAIC (and/or TAC) as those in the above EXAMPLES 11 to 21 can be used.

ene-block copolymer (SBS) as STP and 10 g of TAIC with 800 g of TCE was prepared, and a PPO composition film of about 100 μm thick was obtained through the same steps as in EXAMPLE 1.

EXAMPLES 23 to 34

The composition ratio of PPO, STP and TAIC was varied as shown in the following TABLE 5 to obtain different PPO composition films through the same steps as in EXAMPLE 22.

COMPARATIVE EXAMPLES 12 to 16

The composition ratio of PPO, STP and TAIC was varied as shown also in TABLE 5 to prepare different solutions, and an attempt was made to obtain films through the same steps as in EXAMPLE 22.

TABLE 5

| | EXAMPLES | | | | | | | | | | | | | COMPARATIVE EXAMPLES | | | | |
|---|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 12 | 13 | 14 | 15 | 16 |
| 1) PPO(g) | 110 | 40 | 120 | 40 | 40 | 20 | 40 | 20 | 50 | 170 | 90 | 180 | 25 | 200 | 80 | 10 | 160 | 20 |
| 2) STP(g) | 80 | 150 | 40 | 120 | 40 | 160 | 20 | 175 | 20 | 20 | 30 | 15 | 40 | 0 | 0 | 160 | 10 | 20 |

TABLE 5-continued

|  | EXAMPLES | | | | | | | | | | | | | COMPARATIVE EXAMPLES | | | | |
|---|---|---|---|---|---|---|---|---|---|---|---|---|---|---|---|---|---|---|
|  | 22 | 23 | 24 | 25 | 26 | 27 | 28 | 29 | 30 | 31 | 32 | 33 | 34 | 12 | 13 | 14 | 15 | 16 |
| 3) TAIC(g) | 10 | 10 | 40 | 40 | 120 | 20 | 140 | 5 | 130 | 10 | 80 | 5 | 135 | 0 | 120 | 30 | 30 | 160 |

The obtained compositions were observed and tested in respect to the presence or absence of film-forming property, homogeneity, surface tackiness and tensile strength, the results of which are given in the following TABLE 6, in which the marks "X" and "-" indicate excellent and unmeasurable states, respectively.

The solvent used in mixing PPO, STP and TAIC (and/or TAC) may be the same a that explained in connection with the first feature, and the casting referred to with reference also to the first feature may be carried out substantially through the same steps for forming the film.

TABLE 6

|  |  | EXAMPLES | | | | | | | | | | | | | COMPARATIVE EXAMPLES | | | | |
|---|---|---|---|---|---|---|---|---|---|---|---|---|---|---|---|---|---|---|---|
|  |  | 22 | 23 | 24 | 25 | 26 | 27 | 28 | 29 | 30 | 31 | 32 | 33 | 34 | 12 | 13 | 14 | 15 | 16 |
| 1) | Film-form. prop. | X | X | X | X | X | X | X | X | X | X | X | X | X | no | no | no | no | no |
| 2) | Homogeneity | X | X | X | X | X | X | X | X | X | X | X | X | X | — | — | — | — | — |
| 3) | Surface tack. | X | X | X | X | X | X | X | X | X | X | X | X | no | — | — | — | — | — |
| 4) | Tensile Streng. (Kgf/cm²) | 450 | 300 | 400 | 350 | 200 | 150 | 100 | 150 | 150 | 400 | 300 | 350 | 150 | — | — | — | — | — |

Figure 3:
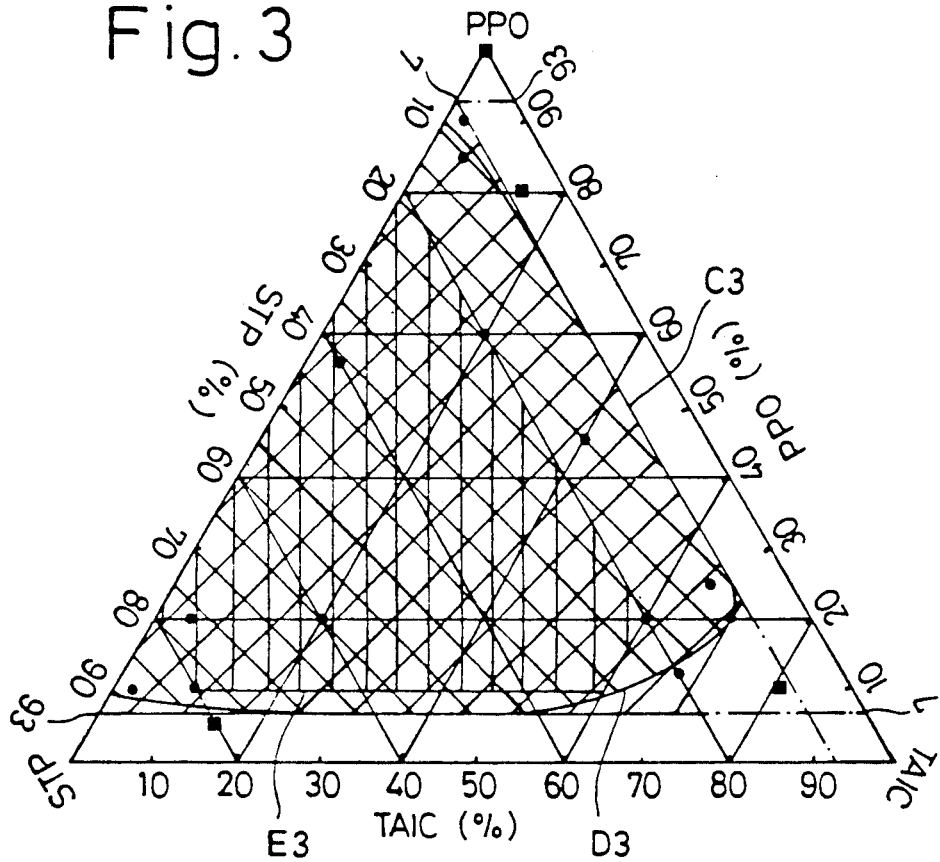
FIG. 3 is also a triangular diagram showing composition ratios of PPO, styrene copolymer (STP) and triallyl isocyanurate (TAIC) employed in EXAMPLES 22 to 34 and in their COMPARATIVE EXAMPLES, which components being taken respectively on each of three sides of the diagram.

As will be clear in view of FIG. 3, in which circular dots represent the composition ratios of EXAMPLES 22 to 34 and square dots represent those of COMPARATIVE EXAMPLES, it is found that the composition ratios of PPO, STP and TAIC used in EXAMPLES 22-34 result in favorable compositions, while the ratios of COMPARATIVE EXAMPLES which are outside the zone C3 in FIG. 3 never provide favorable films.

According to a fourth feature of the present invention, PB is further added to and mixed with the solution of PPO, STP and TAIC (and/or TAC) of the third feature, to provide a film-forming property and obtain a PPO compound. PB may be the one used in EXAMPLES 1 to 10. According to this feature, a favorable PPO compound can be obtained when PPO is present in an amount above 10 and below 90 weight %, STP is present in an amount above 10 and below 90 weight %, TAIC (and/or TAC) is present in an amount less than 80 weight % and PB is present in an amount below 20

EXAMPLE 35

In a reactor having a defoamer and of a capacity of 2 liters, 100 g of PPO, 40 g of SBS as STP, 40 g of TAIC and 20 g of PB were mixed with 800 g of TCE to obtain a PPO composition film of 100 μm thick through the same steps as in EXAMPLE I.

EXAMPLES 36 to 45

The composition ratios of PPO, STP, TAIC and PB were changed as shown in the following TABLE 7 to obtain different PPO composition films through the same steps as in EXAMPLE 35.

COMPARATIVE EXAMPLES 17 to 23

The composition ratios of PPO, STP, TAIC and PB were changed as shown also in TABLE 7, to prepare different solutions in an attempt to obtain films through the same steps as in EXAMPLE 35.

TABLE 7

|  | EXAMPLES | | | | | | | | | | | COMPARATIVE EXAMPLES | | | | | | |
|---|---|---|---|---|---|---|---|---|---|---|---|---|---|---|---|---|---|---|
|  | 35 | 36 | 37 | 38 | 39 | 40 | 41 | 42 | 43 | 44 | 45 | 17 | 18 | 19 | 20 | 21 | 22 | 23 |
| 1) PPO(g) | 100 | 100 | 110 | 120 | 80 | 80 | 130 | 115 | 40 | 25 | 20 | 200 | 20 | 85 | 10 | 100 | 40 | 190 |
| 2) STP(g) | 40 | 60 | 40 | 40 | 100 | 20 | 30 | 45 | 80 | 25 | 150 | 0 | 20 | 45 | 100 | 10 | 40 | 10 |
| 3) TAIC(g) | 40 | 20 | 40 | 20 | 15 | 80 | 25 | 10 | 65 | 140 | 10 | 0 | 20 | 10 | 80 | 70 | 120 | 0 |
| 4) PB(g) | 20 | 20 | 10 | 20 | 5 | 20 | 15 | 30 | 15 | 10 | 20 | 0 | 140 | 60 | 10 | 20 | 0 | 0 | weight %, and most preferred PPO composition films can be obtained when PPO is present in an amount above 30 and below 80 weight %, STP is present in an amount above 20 and below 70 weight %, TAIC (and/or TAC) is present in an amount less than 50 weight % and PB is present in an amount below 10 weight %.

The obtained compositions were observed and tested in respect to the presence or absence of film-forming property, homogeneity, surface tackiness and tensile strength. The results are given in TABLE 8 below, in which marks "X" and "-" represent excellent and unmeasurable states, respectively.

TABLE 8

|  |  | EXAMPLES | | | | | | | | | | | COMPARATIVE EXAMPLES | | | | | | |
|---|---|---|---|---|---|---|---|---|---|---|---|---|---|---|---|---|---|---|---|
|  |  | 35 | 36 | 37 | 38 | 39 | 40 | 41 | 42 | 43 | 44 | 45 | 17 | 18 | 19 | 20 | 21 | 22 | 23 |
| 1) | Film-form. prop. | X | X | X | X | X | X | X | X | X | X | X | no | no | X | X | no | no | no |
| 2) | Homogeneity | X | X | X | X | X | X | X | X | X | X | X | — | — | no | X | — | no | no |
| 3) | Surface tack. | X | X | X | X | X | X | X | X | X | no | X | — | — | no | no | — | no | no |
| 4) | Tensile | 400 | 400 | 400 | 400 | 400 | 350 | 400 | 300 | 250 | 100 | 250 | — | — | — | — | — | — | — |

TABLE 8-continued

| | EXAMPLES | | | | | | | | | | | COMPARATIVE EXAMPLES | | | | | |
|---|---|---|---|---|---|---|---|---|---|---|---|---|---|---|---|---|---|
| | 35 | 36 | 37 | 38 | 39 | 40 | 41 | 42 | 43 | 44 | 45 | 17 | 18 | 19 | 20 | 21 | 22 | 23 |
| streng. (Kgf/cm²) | | | | | | | | | | | | | | | | | | |

It will be seen from TABLE 8 that the composition ratios of PPO, STP, TAIC and PB used in EXAMPLES 35 to 45 result in favorable PPO composition, while those used in COMPARATIVE EXAMPLES 17 to 23 do not result in any favorable compositions.

According to a fifth feature of the present invention, PPO, PS and PB are mixed to obtain PPO compositions having the film-forming property. Here, PPO and PB may be the same as those used in EXAMPLES 1 to 10, and PS may be that used in EXAMPLES 11 to 21.

Figure 4:
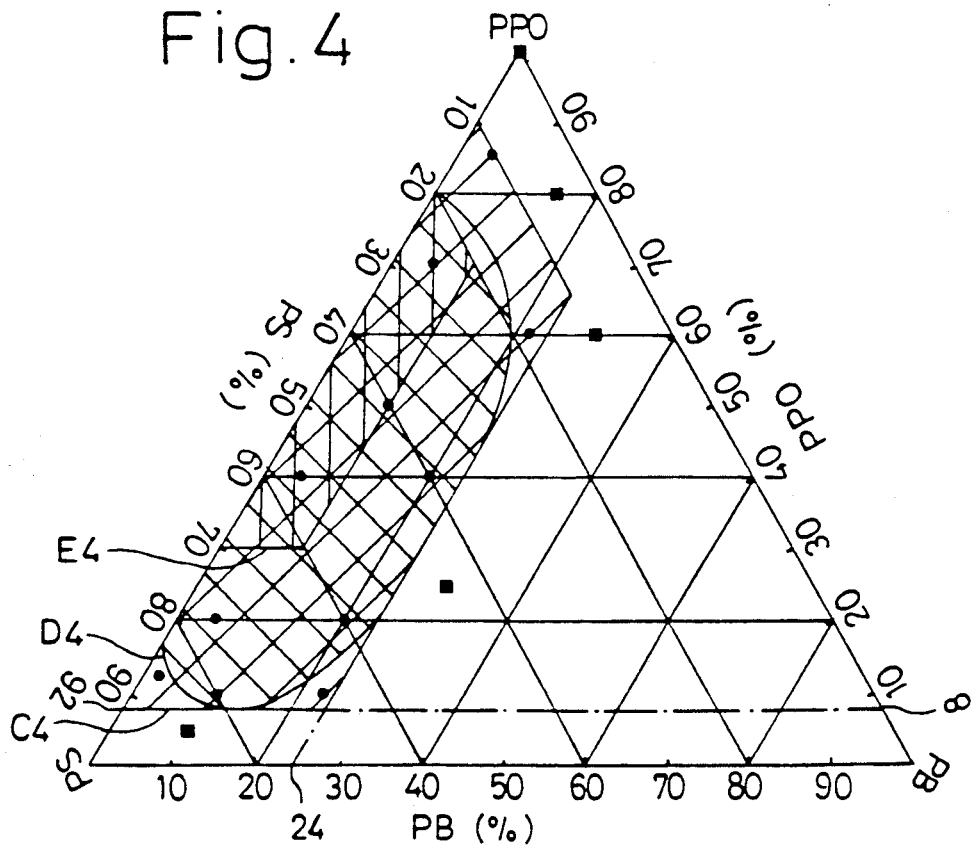
FIG. 4 is a further triangular diagram showing composition ratios of PPO, PS and PB employed in EXAMPLES 35 to 45 and in their COMPARATIVE EXAMPLES, with which components respectively taken on each of three sides of the diagram.

Referring to FIG. 4, a triangular diagram showing the composition ratios of PPO, PS and PB which are taken respectively on each of three sides of the diagram, it will be seen that favorable PPO compositions can be obtained in a zone C4, shaded with rightward upward hatches, wherein PPO is present in an amount above 8 and below 90 weight % PS is present in an amount above 10 and below 92 weight % and PB is present in an amount below 24 weight %; that more preferred PPO compositions can be obtained in a zone D4, located inside the zone C4 and shaded with leftward upward hatches, and that most preferred PPO composition films can be obtained in a zone E4, located inside the zone D4 and shaded with vertical hatches wherein PPO is present in an amount above 30 and below 80 weight %, PS is present in an amount above 20 and below 70 weight % and PB is present in an amount below 10 weight %.

The solvent used in mixing PPO, PS and PB may be the same as that explained in connection with the first feature, and the casting explained also in connection with the first feature may be employed for forming the films as carried out substantially through the same steps.

EXAMPLE 46

In the reactor having a defoamer and of a capacity of 2 liters, 80 g of PPO, 110 g of PS and 10 g of PB were mixed with 800 g of TCE, and a PPO composition film of about 100 μm thick was obtained through the same steps as in EXAMPLE 1.

EXAMPLES 47 to 56

The composition ratios of PPO, PS and PB were changed as shown in the following TABLE 9, and different PPO composition films were obtained through the same steps as in EXAMPLE 46.

COMPARATIVE EXAMPLES 24 to 29

The composition ratios of PPO, PS and PB were changed as shown also in TABLE 9 to prepare different solutions, and an attempt wa made to obtain films also through the same steps as in EXAMPLE 46.

TABLE 9

| | EXAMPLES | | | | | | | | | | | COMPARATIVE EXAMPLES | | | | | |
|---|---|---|---|---|---|---|---|---|---|---|---|---|---|---|---|---|---|
| | 46 | 47 | 48 | 49 | 50 | 51 | 52 | 53 | 54 | 55 | 56 | 24 | 25 | 26 | 27 | 28 | 29 |
| 1) PPO(g) | 80 | 100 | 140 | 40 | 40 | 80 | 20 | 120 | 25 | 20 | 170 | 200 | 10 | 160 | 50 | 120 | 20 |
| 2) PS(g) | 110 | 80 | 50 | 150 | 120 | 80 | 160 | 35 | 170 | 135 | 20 | 0 | 170 | 10 | 90 | 20 | 0 |
| 3) PB(g) | 10 | 20 | 10 | 10 | 40 | 40 | 20 | 45 | 5 | 45 | 10 | 0 | 20 | 30 | 60 | 60 | 80 |

The obtained compositions were observed and tested in respect of the presence or absence of film-forming property, homogeneity, surface tackiness and tensile strength. The results are given in TABLE 10 below, in which marks "X" and "-" represent excellent and unmeasurable states, respectively.

TABLE 10

| | | EXAMPLES | | | | | | | | | | | COMPARATIVE EXAMPLES | | | | | |
|---|---|---|---|---|---|---|---|---|---|---|---|---|---|---|---|---|---|---|
| | | 46 | 47 | 48 | 49 | 50 | 51 | 52 | 53 | 54 | 55 | 56 | 24 | 25 | 26 | 27 | 28 | 29 |
| 1) | Film-form. prop. | X | X | X | X | X | X | X | X | X | X | X | no | X | no | X | X | no |
| 2) | Homogeneity | X | X | X | X | X | X | X | X | X | X | X | — | no | — | no | no | no |
| 3) | Surface tack. | X | X | X | X | X | X | X | X | X | X | X | — | X | — | no | no | no |
| 4) | Tensile streng. (Kgf/cm²) | 300 | 350 | 350 | 250 | 300 | 350 | 200 | 300 | 200 | 200 | 300 | — | — | — | — | — | — |

In view of FIG. 4, in which the composition ratios of EXAMPLES 46 to 56 are plotted by circular dots and those of COMPARATIVE EXAMPLES 24-29 are plotted by square dots, it is found that the favorable PPO composition films can be obtained with the composition ratios of PPO, PS and PB in EXAMPLES 46 to 56, whereas no favorable PPO composition film were obtained using the ratios of COMPARATIVE EXAMPLES 24-29, which are outside the zone C4 in FIG. 4.

According to the foregoing first to fifth features of the present invention, there has been provided a method in which PPO is mixed with at least one crosslinking polymer and/or crosslinking monomer as a setting means that includes polyfunctional components. According to a sixth feature of the present invention, PPO is mixed with at least one crosslinking polymer and/or monomer and an initiator. A PPO composition that exhibits excellent film-forming properties, solvent resistance, heat resistance and strength is thereby obtained.

Referring to the sixth feature, the foregoing STP and PB are preferably used as the crosslinking polymers, but one or a mixture of two or more rubbers may be also used. As the crosslinking monomers, for example, other polyfunctional monomers than TAIC and TAC may be used such as ethylene glycol dimethacrylate, divinylbenzene, diallyl phthalate and the like, such acrylic acids as ester acrylate, epoxy acrylate, urethane acrylate, ether acrylate, melamine acrylate, alkyd acrylate, silicon acrylate and the like, such monofunctional monomers as vinyltoluene, ethyl vinyl benzene, stryene, paramethylstyrene and the like, and mixtures of such polyfunctional monomers.

For the initiator, such organic peroxides as di-cumyl peroxide, t-butyl cumyl peroxide, di-t-butyl peroxide, ketone peroxide, peroxyketal, hydroperoxide, dialkyl peroxide, diacyl peroxide, peroxydicarbonate, peroxyesther and the like may be employed. Further, one or more peroxides selected from the group consisting of those compounds represented by following structural formulas (I), (II) and (III) may also be employed:

$$R'-O-O-R-O-O-R'' \quad (I)$$

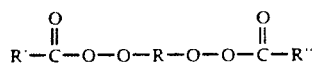  (II)

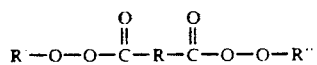  (III)

where R represents a hydrocarbon radical and R' and R" represent a hydrocarbon radical or a hydrogen, and R' may be the same as or different from R".

The peroxides expressed by formula (I) include, for example, 2,2-bis-t-butyl-peroxyoctane, n-butyl-peroxyvalerate, 2,2-bis-t-butyl-peroxybutane, 2,5-dimethyl-hexane-2,5-dihydro-peroxide, 2,2'-bis-t-butyl-peroxy-m-isopropyl-benzene (also known as (1,4 or 1,3)-bis-t-butyl-peroxyisopropyl-benzene)), 2,5-dimethyl-2,5-di-t-butyl-peroxyhexane, 2,5-dimethyl-2,5-di-t-butyl-peroxyhexane-3 and the like. The compounds expressed by formula (II) include, for example, 2,5-dimethyl-2,5-dibenzoyl-peroxyhexane and the like. The compounds expressed by formula (III) include, for example, di-t-butyl-peroxyisophthalate and the like. Among these peroxides listed above, in particular, 2,5-dimethyl-2,5-di-t-butyl-peroxyhexane-3 and α,α-bis-t-butyl-peroxy-m-isopropyl-benzene of formula (I) are preferred.

When the initiator used in the present feature is the peroxide expressed by, for example, formula (I), the crosslinking property can be further enhanced by the application of external physical action as, for example, heating and irradiation of ultraviolet or radioactive ray, which causes O—O coupling in the initiator to be cut. That is,

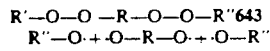

to cause radical reaction to take place, which reaction further proceeds as

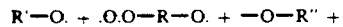

-continued

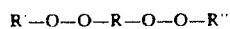

According to this sixth feature, it has been found that the desired PPO composition can be obtained when PPO is present in an amount from 50 to 95 weight %, the crosslinking polymer and/or crosslinking monomer is present in an amount from 5 to 50 weight %, and the initiator is present in an amount from 0.1 to 5.0 weight %. The solvent used in mixing them may be the same as explained in connection with the first feature, and the film formation may also be carried out by casting substantially through the same steps as in the case of the first feature.

According to a seventh feature of the present invention a method of manufacturing a laminate using the PPO compositions is provided. In this case, PPO, crosslinking polymer and/or crosslinking monomer are used in preparing the PPO composition film for the manufacture of the laminate, wherein PPO may be the same as used in EXAMPLES 1 to 10, and the crosslinking polymer and/or the crosslinking monomer may be the same as those detailed in connection with the sixth feature. If an initiator is employed, it is also possible to use an initiators, other than the organic peroxides such as BIS-CUMYL, a product available from the Japanese firm NIPPON YUSHI KABUSHIKI KAISHA having the following structure (hereinafter referred to as "BC"):

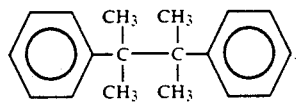

BC has a one-minute half-life temperature of 330° C.

In mixing PPO with the crosslinking polymer and/or crosslinking monomer and, if desired, the initiator, the same solvent as that explained in connection with the first feature may be used and, in forming the films, the casting may be carried out substantially through the same steps as in the case of the first feature.

According to a predetermined laminate design, an appropriate number of the PPO composition films, as well as such metallic foils as copper, aluminum or the like, are properly stacked and preferably heat-pressed so that the films will melt to bond with each other and with the metallic foils so as to form a laminate. In this case, the heat-press temperature is set depending on the reaction temperature of the initiator, and is usually within a range of about 150° to 300° C. The heat-press pressure and time are also to be appropriately set, and are preferable under 50 Kg/cm² for 10 to 60 minutes. It is possible to add to such a laminate a further metallic foil as overlaid onto one or both surfaces of the laminate and bonded thereto through a further carried out hot-press step.

EXAMPLES 57

In a 2 liter reactor having a defoamer, 120 g of PPO, 40 g of SBS, 18 g of 1,2 PB, 20 g of TAIC and 2 g of BC were mixed by adding TCE until a solution of 30 weight % was obtained. PPO composition films of 100 μm thick were obtained substantially through the same steps as in EXAMPLE 1. Then, ten of these prepared films were stacked and pressed to be of a dimension of 200×200 mm, a copper foil of 35 μm thick was placed on each of the upper and lower surfaces of the laminate. heat-press was carried out at a temperature of 240° C. and under a pressure of 50 Kg/cm² for 30 minutes with respect to the laminate, and a both-faced copper-clad laminate was obtained.

EXAMPLES 58 to 66

The composition ratios of PPO, SBS, PB and TAIC were varied as shown in the following TABLE 11 with a suitable initiator (INIT) selected and added, and different PPO composition films were formed into different laminates through the same steps as in EXAMPLE 57.

COMPARATIVE EXAMPLES 30 and 31

The composition ratio of the materials of EXAMPLE 57 was varied as shown in TABLE 11, as COMPARATIVE EXAMPLES 30 and 31, in an attempt to obtain PPO composition laminates through the same steps as in EXAMPLE 57.

strength and soldering heat resistance. In the case of this feature, PPO and crosslinking polymer and/or crosslinking monomer are used in making the PPO composition films for the preparation of laminate, as in the case of the seventh feature. PPO may be the same as used in the foregoing EXAMPLES 1 to 10, while the crosslinking polymer and/or monomer may be the ones that exhibit a good crosslinking property when exposed to the irradiation. Such materials as disclosed in connection with the sixth feature may be also used as the crosslinking polymer and/or monomer. It is also possible to use poly-para-methyl-styrene among the crosslinking resins or polymers disclosed in connection with the sixth feature, and TAIC among the crosslinking assistants or monomers disclosed also in connection with the sixth feature, in improving the crosslinking property by means of the irradiation. It has been found that TAIC increases the crosslinking degree up to 90% when exposed to 50 Mrad irradiation. The initiators explained in connection with the sixth feature and BC explained in connection with the seventh feature may be used concurrently. Other than such initiators as explained in the

TABLE 11

| | EXAMPLES | | | | | | | | | | COMPARATIVE EXAMPLES | |
|---|---|---|---|---|---|---|---|---|---|---|---|---|
| | 57 | 58 | 59 | 60 | 61 | 62 | 63 | 64 | 65 | 66 | 30 | 31 |
| PPO(g) | 120 | 120 | 120 | 120 | 120 | 120 | 120 | 140 | 160 | 140 | 188 | 172 |
| SBS(g) | 40 | 40 | 40 | 40 | 40 | 40 | 40 | 38 | 18 | 48 | 10 | — |
| 1,2PB(g) | 18 | 18 | 18 | 18 | 18 | 18 | 18 | — | — | — | — | 8 |
| TAIC(g) | 20 | 20 | 20 | 20 | 20 | 20 | 20 | 20 | 20 | 10 | — | — |
| INIT(g) | BC2 | DCP2 | F2 | G2 | H2 | I2 | J2 | H2 | H2 | H2 | H2 | 120 |

On the line of the initiator (INIT) in the above TABLE 11, DCPO is dicumyl peroxide. F is t-butylcumyl-peroxide, G is di-t-butyl-peroxide, H is 2,5-dimethyl-2,5-di-t-butyl-peroxyhexane-3, I is 2,5-dimethyl-2,5-di-t-butyl-peroxyhexane, and J is α,α'-bis-t-butyl-peroxy-m-isopropyl-benzene.

TABLE 12 shows the results of tests made on the obtained laminates in respect of (I) the room temperature peeling-strength, (II) soldering heat resistance, (III) insulation resistance, (IV) dielectric constant and (V) dielectric loss tangent, in which hyphens "-" indicate an unmeasurable state:

sixth feature, i.e., the organic peroxides, there may be enumerated as the initiator, benzoin, benzyl, allyldiazonium fluoroborate, benzylmethylketal, 2,2-diethoxyacetophenone, benzoyl isobutyl ether, p-t-butyltrichloroacetophenone, benzyl-o-ethoxy carbonyl-α-monooxime, biacetyl, acetophenone, benzophenone, tetramethylthiuram sulfide, azobisisobutyronitril, benzoyl peroxide, 1-hydroxycyclohexyl phenylethane, 2-hydroxy-2-methyl-1-phenylpropane-1-one, 1-(4-isopropylphenyl)-2-hydroxy-2-methylpropane-1-one, 2-chlorothioxanthone, methylbenzoyl formate, 4,4-bis-dimethylamino-benzophenone (Michler's ketone), ben-

TABLE 12

| | | EXAMPLES | | | | | | | | | | COMPARATIVE EXAMPLES | |
|---|---|---|---|---|---|---|---|---|---|---|---|---|---|
| | | 57 | 58 | 59 | 60 | 61 | 62 | 63 | 64 | 65 | 66 | 30 | 31 |
| (I) | (Kg/cm) | 1.5 | 1.8 | 1.8 | 1.8 | 1.8 | 1.8 | 1.8 | 1.8 | 2.0 | 2.0 | — | — |
| (II) | (sec) | 20 | 30 | 60 | 60 | 60 | 60 | 60 | 60 | 60 | 30 | — | — |
| (III) | (Ω) | $10^{15}$ | $10^{15}$ | $10^{15}$ | $10^{15}$ | $10^{15}$ | $10^{15}$ | $10^{15}$ | $10^{15}$ | $10^{15}$ | $10^{15}$ | — | — |
| (IV) | (9 GHz) | 2.6 | 2.6 | 2.6 | 2.6 | 2.6 | 2.6 | 2.6 | 2.6 | 2.6 | 2.4 | — | — |
| (V) | (9 GHz) | 0.003 | 0.003 | 0.003 | 0.003 | 0.003 | 0.003 | 0.003 | 0.003 | 0.003 | 0.002 | — | — |

It can be seen that the metal-clad laminates of EXAMPLES 57 to 66 are extremely excellent in the room temperature peeling-strength, soldering heat resistance and insulation resistance, fairly excellent in the dielectric constant and dielectric loss tangent based on the U.S. Military Specification and Standard (MIL), excellent in high frequency characteristics, and thus suitable for use in such superhigh frequency bands as the X band.

According to an eighth feature of the present invention, a step of irradiating the laminates with a radioactive ray may be added to the foregoing seventh feature so as to maintain the dielectric characteristics and to remarkably improve the room temperature peelingzoin-methyl-ether, methyl-o-benzoyl-benzoate α-acyloxime ester, and the like.

In mixing PPO with the crosslinking polymer and/or crosslinking monomer with the addition, if necessary, of the initiator, similarly to the foregoing features, the same solvent as explained in connection with the first feature may be employed to prepare a solution, and the film formation may be carried out by means of the casting substantially through the same steps as disclosed in connection with the first feature.

The required number for a predetermined laminate design thickness of such films thus obtained and such metallic foils as copper or aluminum foils were properly sequentially stacked, and processed through the same steps as in the seventh feature into the metal-clad laminate of the design thickness of, for example, 0.2 to 2.0 mm, preferably about 0.6 to 0.8 mm, and suitable for a circuit design. Subsequentially the laminate was exposed to an irradiation ($\beta$ray, $\gamma$ray or the like) by an amount of 10 to 70 Mrad, preferably 40 to 60 Mrad, according to the composition ratio of the macromolecular materials employed, so as to induce the thermal melting and bonding property of PPO, to increase the crosslinking property at the bonding boundary surfaces between the films and the metallic foils, and to thereby complete the metal-clad laminate.

EXAMPLES 67 to 76

Each of the laminates prepared in the EXAMPLES 57 to 66 was exposed to 30 Mrad irradiation (of $\beta$ray).

The thus obtained metal-clad laminates were tested in respect of (I) the room temperature peeling-strength, (II) soldering heat resistance, (III) insulation resistance, (IV) dielectric constant and (V) dielectric loss tangent. Results of such tests are given in TABLE 13.

TABLE 13

| | | EXAMPLES | | | | | | | | | |
|---|---|---|---|---|---|---|---|---|---|---|---|
| | | 67 | 68 | 69 | 70 | 71 | 72 | 73 | 74 | 75 | 76 |
| (I) | (Kg/cm) | 2.4 | 2.5 | 2.5 | 2.5 | 2.5 | 2.5 | 2.5 | 2.5 | 2.5 | 2.5 |
| (II) | (sec) | 40 | 60 | 90 | 90 | 90 | 90 | 90 | 90 | 90 | 90 |
| (III) | ($\Omega$) | $10^{15}$ | $10^{15}$ | $10^{15}$ | $10^{15}$ | $10^{15}$ | $10^{15}$ | $10^{15}$ | $10^{15}$ | $10^{15}$ | $10^{15}$ |
| (IV) | (9 GHz) | 2.6 | 2.6 | 2.6 | 2.6 | 2.6 | 2.6 | 2.6 | 2.6 | 2.6 | 2.4 |
| (V) | (9 GHz) | 0.003 | 0.003 | 0.003 | 0.003 | 0.003 | 0.003 | 0.005 | 0.003 | 0.003 | 0.002 |

As can be seen from Comparison between TABLES 13 and 12 that, according to the present feature, the room temperature peeling-strength and soldering heat resistance of the laminates can be remarkably improved, while the insulation resistance, dielectric constant and dielectric loss tangent remain substantially unchanged so as to maintain the excellent dielectric characteristics.

According to a ninth feature, PPO, TAIC (and/or TAC) are used as basic materials to obtain the laminate of the PPO composition films. PPO may be the same as in EXAMPLES 1 to 10 and TAIC (and/or TAC) may be the same as explained in connection with the second feature. In the present feature, it is desirable that PPO be present in an amount from 50 to 95 weight % and TAIC (and/or TAC) be present in an amount from 5 to 50 weight %. In mixing these materials, 0.1 to 5.0 weight % of an initiator is preferably added and mixed therewith.

For the purpose of improving the film-forming property, it is further preferable to add to this mixture PB.

In mixing these materials, the same solvent as explained in connection with the first feature may be used. Even a mere mixing may be sufficient. The films may be formed by means of the casting performed substantially through the same steps as explained in connection with the first feature. A required number of the films thus obtained and metallic foils are stacked to a predetermined laminate design thickness and processed through the same steps as in the seventh feature into a metal-clad laminate having a thickness of preferably 0.6 to 0.8 mm, and suitable for a circuit design.

In forming the laminate, if desired, it may be possible to employ even a resin-impregnated substrate, which may be glass cloth, glass mat, polyester cloth, aramid fiber cloth, paper, unwoven cloth or the like, impregnated with a resin solution containing PPO, TAIC (and/or TAC) and, if necessary, an initiator and/or PB and dried. The impregnation may be made alternatively with a solution containing such other material than PB as the crosslinking polymer and/or monomer disclosed in the sixth feature, added to PPO, TAIC (and/or TAC) and, if necessary, an initiator, the solution being also dried.

In forming the laminate with such a resin-impregnated substrate, a required number of the PPO composition films and metallic foils for a predetermined design thickness of the laminate are stacked on the substrate, a stack thus obtained is heat-pressed so that the resin-impregnated substrate, PPO composition films and metallic foils will be mutually firmly bonded, with the adhesion of PPO being utilized, and the desired metal-clad laminate will be obtained. In this case, the heat-press temperature is set depending on the reaction temperature of the initiator, usually within a range of 150° and 300° C., while the pressure and time are set preferably to be 10 to 150 Kg/cm$^2$ and for about 10 to 90 minutes.

EXAMPLE 77

180 g of PPO, 170 g of SBS, 650 g of TAIC, 20 g of 2,5-dimethyl-2,5-di-t-butyl-peroxyhexane-3 (PH25B) and 3000 g of TCE were mixed while being heated to 50° C. in a container having an agitator until completely dissolved and a resin solution was obtained. A glass cloth of E glass 100 $\mu$m thick (104.5 g/m$^2$) was immersed into the resin solution and was dried at 70° C. for 5 minutes. A prepreg having a resin content of 50% was then prepared.

Six of the above prepregs were stacked with copper foils of 18 $\mu$m, the stack was heated and compressed by means of a laminating press at 200° C. under 10 kg/cm$^2$ for 40 minutes, and a laminate of a thickness of 0.8 mm and both of its outermost surfaces being copper-clad was obtained. Various properties of this laminate are as shown in Table 14.

EXAMPLE 78

250 g PPO, 250 g SBS, 500 g TAIC, 20 g PH25B and 3000 g TCE were employed and a laminate, both of its outermost surfaces being copper-clad, was prepared in the same manner as in EXAMPLE 77. The properties of the laminate are a shown in Table 14.

EXAMPLE 79

330 g PPO, 320 g SBS, 250 g TAIC, 20 g PH25B and 3000 g TCE were employed and a laminate, both of its outermost surfaces being copper-clad, was prepared in the same manner as in EXAMPLE 77. The properties of the laminate are as shown in Table 14.

TABLE 14

| | EXAMPLE 77 | EXAMPLE 78 | EXAMPLE 79 |
|---|---|---|---|
| Specific Inductivity (1 MHz) | 3.5 | 3.4 | 3.4 |

TABLE 14-continued

|  | EXAMPLE 77 | EXAMPLE 78 | EXAMPLE 79 |
|---|---|---|---|
| Dielectric Loss (1 MHz) | 0.003 | 0.003 | 0.0025 |
| Soldering Heat (260° C.) Resist. (sec.) | | | |
| Bef. PCT | 120< | 120< | 120< |
| Aft. PCT | 60< | 60< | 60< |
| Oven Heat Resist. (°C.) | 280 | 280 | 280 |
| Solvent Resist. (boiled TCE) | Good | Good | Good |
| Volume Resistivity (Ω-cm) | $5 \times 10^{15}$ | $5 \times 10^{15}$ | $5 \times 10^{15}$ |
| Insulation Resistance (Ω) | $5 \times 10^{14}$ | $7 \times 10^{14}$ | $7 \times 10^{14}$ |
| Water Absorption (%) | 0.20 | 0.15 | 0.15 |

The laminate including resin-impregnated substrate and prepared in the above-mentioned manner can be exposed to heat and/or an irradiation of ultraviolet light or radioactive ray ($\beta$ or $\gamma$ ray), and radical reaction takes place so as to enhance the hardening of the laminate.

In preparing the metal-clad laminate, it is not always necessary to stack the metallic foils simultaneously with the film.

EXAMPLE 80

In the reactor having the defoamer, 140 g of PPO, 60 g of TAIC and 4 g of 2,5-dimethyl-2, 5-t-butyl-peroxyhexane-3 as the initiator were mixed by adding TCE until the mixture became a solution of 20 weight %. PPO composition films of 100 μm thick were obtained substantially through the same steps as in the foregoing EXAMPLES. Six of such films were stacked and heat-pressed at a temperature of 200° C., under a pressure of 50 Kg/cm² and for 30 minutes, and a laminate of 0.8 mm thick was obtained.

EXAMPLE 81

160 g of PPO, 40 g of TAIC and 2 g of 2,5-dimethyl-2,5-di-t-butylperoxyhexane-3 as the initiator were mixed by adding TCE until the mixture became a 15 weight % solution. This solution was used in having a glass cloth impregnated therewith to form through drying a resin-impregnated substrate. Thereafter, a copper foil, three of the thus obtained resin-impregnated substrates and a copper foil were stacked in the order mentioned and heat-pressed at a temperature of 200° C., under a pressure of 50 Kg/cm² and for 30 minutes so as to be formed into a laminate of 0.8 mm thick.

EXAMPLE 82

The composition ratio of EXAMPLE 80 was changed to 100 g of PPO, 100 g of TAIC, and 4 g of α,α-bis-t-butylperoxy-m-isopropyl benzene as the initiator, and a laminate similar to that of EXAMPLE 80 was obtained substantially through the same steps.

EXAMPLE 83

The composition ratio of EXAMPLE 81 was changed to 180 g of PPO, 20 g of TAIC, and 2 g of 2,5-dimethyl-2,5-t-butylperoxyhexane-3 as the initiator, to obtain a laminate including the resin-impregnated substrates similar to that of EXAMPLE 81 substantially through the same steps.

EXAMPLE 84

The composition ratio of EXAMPLE 80 was changed to 140 g of PPO, 40 g of TAIC, 20 g of 1,2-PB, and 4 g of 2,5-dimethyl-2,5-t-butylperoxyhexane-3 to form the PPO composition films, 15 sheets of which were stacked and heat-pressed under a pressure of 100 Kg/cm², but without changing other conditions of the steps of EXAMPLE 80 for forming the laminate thereof.

EXAMPLE 85

The composition ratio of EXAMPLE 81 was changed to 120 g of PPO, 40 g of TAIC, 40 g of 1,2-PB, and 2 g of α,α'-bis-t-butylperoxy-m-isopropylbenzene as the initiator, and a laminate including the resin-impregnated substrates similar to that of EXAMPLE 81 was obtained through a heat-press process that used a temperature and time of 200° C. and 60 minutes, respectively, but without changing the other conditions.

EXAMPLE 86

The composition ratio of EXAMPLE 80 was changed to 160 g of PPO, 20 g of TAIC, 20 g of 1,2-PB, and 2 g of an initiator, and a laminate similar to that of EXAMPLE 80 was obtained substantially through the same steps.

The thus obtained laminates of EXAMPLES 80 to 86 were tested in respect of (I) the room temperature peeling-strength, (II) soldering heat resistance, (III) insulation resistance, (IV) dielectric constant and (V) dielectric loss tangent. The results are given in TABLE 15 as follows:

TABLE 15

|  |  | EXAMPLES | | | | | | |
|---|---|---|---|---|---|---|---|---|
|  |  | 80 | 81* | 82 | 83* | 84 | 85* | 86 |
| (I) | (Kg/cm) | 2.0 | 2.5 | 2.0 | 2.5 | 2.0 | 2.5 | 2.0 |
| (II) | (sec) | 60 | >120 | 60 | >120 | 90 | >120 | 90 |
| (III) | (Ω) | $10^{15}$ | $10^{15}$ | $10^{15}$ | $10^{15}$ | $10^{15}$ | $10^{15}$ | $10^{15}$ |
| (IV) | (10 GHz) | 2.6 | 3.0 | 2.65 | 2.95 | 2.6 | 2.9 | 2.55 |
| (V) | (10 GHz) | 0.003 | 0.004 | 0.003 | 0.003 | 0.003 | 0.003 | 0.002 |

From comparisons of TABLE 15 with TABLES 12 and 13, it will be appreciated that the room temperature peeling-strength, soldering heat resistance and dielectric characteristics remained excellent. Regarding the soldering heat resistance the test for which has been carried out throughout the seventh to the ninth features by measuring required time (sec) until the laminate surface starts to blister after being put in a solder bath of 260° C., it is found that the laminates including the resin-impregnated substrate of glass cloth according to EXAMPLES 81, 83 and 85 denoted by mark "*" in TABLE 15 provide a further improved soldering heat resistance. It has been further found that the laminates of EXAMPLES 80 to 86 are also high in solvent resistance, as proved by dipping them in a boiling TCE solution for 5 minutes, resulting in no surface change at all and thus showing that their hardening is sufficient.

According to the present invention, further modifications are possible. For example, other combinations of the materials for the PPO composition than those referred to in the foregoing EXAMPLES may be adopted. In an event, as will be readily appreciated, where such materials as PB, TAIC, TAC and the like which per se do not have the film-forming property are employed as the setting means, it is necessary to add means for providing to PPO the film-forming property, such as polystyrene, poly-paramethylstyrene or the like referred to. In the case, on the other hand, when such crosslinking polymer as STP which itself has both of the setting and film-forming properties, it is of course not required to add any other means for providing to PPO the film-forming property.

Further, the PPO composition according to the present invention is suitable not only for making the laminates, but also in the form of a single film as further hardened to be in C-stage, in which instance the film may be provided on one surface with, for example, a printed-wiring so as to form a circuit film.

It will be also appreciated that, in adhering the metallic foil to the films, the use of the PPO composition according to the present invention allows such adhesion to be reliably achieved without using any separate adhesive such as epoxy resin or the like, and that, in this respect, too, the invention achieves improvements in the heat-resistance and high frequency characteristics.

Further, as PPO exhibits a low dielectric constant and less dielectric loss, another feature of the present invention lies in the preparation of a PPO resin composition that has a desired dielectric constant by mixing with the aforementioned PPO compositions an inorganic filler. Such a filler can be chosen such that the final PPO resin composition exhibits any desired dielectric constant. It is preferable to use an inorganic filler that has as large a dielectric constant as possible. Thus, the inorganic filler should preferably be of a relative dielectric constant of above 10.

Suitable inorganic fillers include such ceramics as titanium dioxide ceramics, barium titanate ceramics, lead titanate ceramics, strontium titanate ceramics, calcium titanate ceramics, bismuth titanate ceramics, magnesium titanate ceramics, lead zirconate ceramics, and the like. These fillers can be used alone or in a mixture of two or more. This mixture can be sintered. Further, the ceramics can be refined or can be present as raw materials. If used as raw materials, the ceramics are preferably crushed after sintering. The inorganic fillers have different dielectric properties depending not only on their composition but also on their sintering and crushing conditions, i.e., particle size and particle size distribution. Their sintering condition varies according to the particular inorganic filler, but it is substantially the same as the calcining condition of ceramic dielectrics made from these fillers. While some of the calcined ceramic dielectrics are very hard and not easily crushed, it is necessary to crush the dielectric until a fixed particle size is obtained because, to a large extent, the particle size determines the dielectric properties. Further, since the particle size intimately relates to the ease of fabrication of uniform PPO resin compositions that include the inorganic filler, it is preferable that the inorganic filler be of finely divided particles of a size less that 50 $\mu$m so that the production of the final product is not inconvenient. The particle size should preferably be in the range of 0.1 to 20 $\mu$m, or, most preferably, in the range of 0.5 to 7 $\mu$m so as to avoid difficulties that may arise when the particle size is too small.

While the inorganic filler may be used without any special surface treatment, it is possible to perform a surface treatment to improve, for example, the heat resistance and water absorption of the hardened composition. To this end, coupling agents such as silane, titanium, and the like are used.

With the use of inorganic fillers that exhibit high dielectric constants, the resulting PPO resin compositions are relatively high in their dielectric constant in their hardened product state. It is also possible to adjust the dielectric constant of the hardened product of the PPO resin composition over a wide range by choosing the appropriate type and amount of the dielectric material used as the inorganic filler. That is, the inorganic filler acts as a dielectric constant adjuster and any type of filler high in dielectric constant may be used when it is only intended to elevate the dielectric constant. The upper limit of the amount of inorganic filler that can be used in the PPO resin composition is the point where undesirable loss of strength of the PPO resin composition occurs, such as where the hardened PPO resin composition product becomes porous.

The composition ratio of the inorganic filler may be up to 450 parts by weight with respect to 100 parts by weight of the PPO resin composition except any solvent utilized, i.e., the resin composition including PPO, setting means, initiator, and any other organic material added as desired. In practice, the ratio should be below 400 parts, preferably below 200 parts by weight of the PPO resin composition, as ratios over 450 parts by weight create undesirable strength deterioration. There is substantially no lower limit since the mere addition of an inorganic filler has a positive effect on the PPO resin composition. However, the addition of less than 5 parts by weight of inorganic filler to 100 parts by weight of the PPO resin composition causes no appreciable effect, while a practically appreciable effect arises when the inorganic filler is added in an amount of at least 30 parts by weight to 100 parts by weight of the PPO resin composition.

The adjustment of the dielectric constant by the addition of an inorganic filler may be illustrated as follows. A PPO composition comprising 70 parts by weight of PPO, 15 parts by weight of styrene-butadiene copolymer, 14 parts by weight of triallyl isocyanurate, and 1 part by weight of dicumyl peroxide exhibits a dielectric constant of 2.6 and a dielectric loss of 0.002 at 23° C. and 1 MHz. When 255 parts by weight of barium titanate are added to 100 parts by weight of this PPO composition, the dielectric constant and dielectric loss of the PPO composition becomes 9.2 and 0.009 at 23° C. and 1 MHz, respectively. Since the dielectric constant of barium titanate is 2000, the composition ratio of barium titanate added as the inorganic filler bears a close relationship to the dielectric properties of the PPO resin composition. Accordingly the dielectric constant of the PPO resin composition can be set by fixing the composition ratio of the inorganic filler to the level that achieves the desired dielectric constant.

To this end, the PPO composition and any other organic materials are dissolved in a suitable solvent so as to obtain a solution of 5 to 50 weight %. An inorganic filler is added to the solution to adjust the dielectric constant of the resin composition solution. Of course, the inorganic filler is not dissolved but is dispersed in the solution. A substrate is impregnated with this PPO resin/inorganic filler composition by dipping the substrate into the solution so as to deposit the composition onto the substrate. The solvent may be removed from the produced prepreg by, e.g., drying or the composition may be semi-hardened so as to be in the B stage. The resin composition content of the prepreg is preferably from 30 to 80 weight %.

The produced product, such as a laminate, of the PPO resin/inorganic filler composition retains the desirable properties of PPO and is excellent in its dielectric properties, heat resistance, chemical resistance, and dimensional stability. Furthermore, the dielectric constant of the composition can be set by the appropriate selection of the type and amount of the added inorganic filler, while the dielectric loss of the composition remains low. The following examples illustrate this aspect of the present invention.

EXAMPLE 87

In a 2 l. reactor having a vacuum means, 100 g of PPO, 30 g of styrene-butadiene copolymer, 40 g of triallyl isocyanurate, and 2 g of 2,5-dimethyl-2,5-di-t-butyl-peroxyhexane-3 were mixed with 750 g of trichloroethylene sufficiently into a uniform solution. Thereafter, 150 g of powdery barium titanate ($BaTiO_3$) of an average particle size of 1 to 2 m was added and mixed with the solution in a ball mill for about 24 hours, so as to be uniformly dispersed therein. Deaeration was then performed and the resultant PPO resin composition solution was applied onto a film of polyethylene terephthalate (PET) by means of a coating applicator so as to be 500 m thick. The coating was dried at 50° C. for about 10 minutes. The produced film of the composition was separated from the PET film and was further dried at 170° C. for 20 minutes to completely remove trichloroethylene and a sheet of the PPO resin composition having a thickness of about 150 m was obtained. Four of the sheets were stacked and joined under conditions of 220° C. and 50 kg/cm$^2$ for 30 minutes, to have them completely set, and a laminate was thereby obtained.

EXAMPLES 88-107

EXAMPLES 88 to 107 as well as COMPARATIVE EXAMPLES 32 and 33 were carried out to obtain a variety of laminates. The process steps were substantially identical to those of EXAMPLE 87. The composition ratio of the solution as well as the solid state properties of the obtained laminates, including those of EXAMPLE 87, are as shown in TABLE 16, in which the composition ratio of the inorganic filler is shown in parts by weight with respect to 100 parts of the PPO composition solution.

TABLE 16

| | EXAMPLES | | | | | | | | | | COMPARATIVE EXAMPLES | |
|---|---|---|---|---|---|---|---|---|---|---|---|---|
| | 87 | 88 | 89 | 90 | 91 | 92 | 93 | 94 | 95 | 96 | 32 | 33(*6) |
| Composition Ratio (wt. %) | | | | | | | | | | | | |
| PPO | 100 | 100 | 100 | 100 | 100 | 100 | 100 | 100 | 100 | 100 | 100 | 40 |
| Crosslink. polymer(*1) | 30 | 30 | 30 | 30 | 30 | 30 | 30 | 30 | 30 | 30 | 30 | 40 |
| Crosslink. monomer(*2) | 40 | 40 | 40 | 40 | 40 | 40 | 40 | 40 | 40 | 40 | 40 | 120 |
| Initiator(*3) | 2 | 2 | 2 | 2 | 2 | 2 | 2 | 2 | 2 | 2 | 2 | 6 |
| Inorg. filler(*4) | A 87 | A 145 | A 200 | B 87 | A 47 B 58 | C 87 | A 58 D 17 E 6 F 3 | A 35 G 12 | H 58 | J 36 | — | — |
| Solid State Properties: | | | | | | | | | | | | |
| Dielec. const. (1 MHz) | 9.2 | 11.5 | 12.8 | 8.0 | 8.6 | 8.1 | 14.6 | 7.2 | 6.9 | 15.0 | 2.7 | 3.0 |
| Dielec. loss (1 MHz) | 0.009 | 0.010 | 0.011 | 0.009 | 0.010 | 0.010 | 0.012 | 0.011 | 0.010 | 0.015 | 0.003 | 0.003 |
| Soldering heat resist. (sec) | 120 | 120 | 120 | 120 | 120 | 120 | 120 | 120 | 120 | 90 | 30 | 90 |
| Chemical resist.(*5) | OK | OK | OK | OK | OK | OK | OK | OK | OK | OK | OUT | OK |
| Thermal exp. coeff. XY direct. (ppm/°C) | 45 | 40 | 40 | 50 | 45 | 45 | 45 | 50 | 50 | 50 | 100 | 20 |

| | EXAMPLES | | | | | | | | | | |
|---|---|---|---|---|---|---|---|---|---|---|---|
| | 97 | 98 | 99 | 100 | 101 | 102 | 103 | 104 | 105 | 106 | 107 |
| Composition Ratio (wt. %) | | | | | | | | | | | |
| PPO | 100 | 100 | 100 | 40 | 40 | 40 | 40 | 40 | 40 | 40 | 25 |
| Crosslink. polymer | 30 | 30 | 30 | 40 | 40 | 40 | 40 | 40 | 40 | 40 | 25 |
| Crosslink. monomer | 40 | 40 | 40 | 120 | 120 | 120 | 120 | 120 | 120 | 120 | 50 |
| Initiator | 2 | 2 | 2 | 6 | 6 | 6 | 6 | 6 | 6 | 6 | 2 |
| Inorg. filler | K 145 | L 116 | M 116 | A 63 | B 73 | C 73 | G 49 | K 121 | L 97 | M 97 | N 99 |
| Solid State Properties: | | | | | | | | | | | |
| Dielec. const. (1 MHz) | 8.0 | 9.5 | 10.0 | 8.5 | 9.0 | 9.1 | 7.0 | 10.7 | 9.5 | 10.2 | 10.5 |
| Dielec. loss (1 MHz) | 0.004 | 0.005 | 0.003 | 0.004 | 0.005 | 0.004 | 0.004 | 0.004 | 0.004 | 0.005 | 0.003 |
| Soldering heat resist. (sec) | 120< | 120< | 120< | 120< | 120< | 120< | 120< | 120< | 120< | 120< | 120< |
| Chemical | OK | OK | OK | OK | OK | OK | OK | OK | OK | OK | OK |

TABLE 16-continued

| resist | | | | | | | | | | | |
|---|---|---|---|---|---|---|---|---|---|---|---|
| Thermal exp. coeff. XY direct. (ppm/°C.) | 15 | 15 | 15 | 17 | 16 | 16 | 19 | 15 | 15 | 15 | 15 |

(*1) — styrene-butadiene
(*2) — triallyl isocyanurate
(*3) — 2,5-dimethyl-2,5-di-t-butyl-peroxyhexane-3
(*4) — A = BaTiO$_3$; B = PbZrO$_3$; C = PbTiO$_3$; D = SrTiO$_3$; E = CaTiO$_3$; F = MgTiO$_3$; G = BaZrO$_3$; H = K$_2$O—PbO—SiO$_2$ glass; J = Pb$_2$ZrO$_3$TiO$_3$O$_3$
(*5) — appearance change after 5 min. dipping in boiled TCE.
(*6) — laminate including glass cloth.
K = TiO$_2$; L = Bi$_4$Ti$_3$I$_{12}$; M = TiO$_2$ + BaTiO$_3$ + ZrO$_2$ calcined powder; N = TiO$_2$ + BaTiO$_3$ + SrTiO$_3$ calcined powder While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed as our invention is:

1. A method of preparing a film-forming polyphenylene oxide composition, comprising: mixing polyphenylene oxide and a setting means for said polyphenylene oxide, wherein said setting means contains at least one polyfunctional component that is compatible with said polyphenylene oxide; and allowing said setting means to crosslink so as to provide said composition with the ability to form a film, and wherein the polyphenylene oxide is not cross-linked.

2. The method according to claim 1, further comprising mixing an initiator with said polyphenylene oxide and said setting means and allowing said setting means and said initiator to crosslink so as to provide said composition with the ability to form a film.

3. The method according to claim 2, wherein said setting means is selected from the group consisting of a crosslinking monomer, crosslinking polymer, and mixtures thereof.

4. The method according to claim 2 wherein said setting means comprises triallyl isocyanurate, triallyl cyanurate, or mixtures thereof.

5. The method according to claim 2 wherein said setting means comprises styrene copolymer and triallyl isocyanurate.

6. The method according to claim 2 wherein said initiator is 2,5-dimethyl-2,5-di-t-butyl peroxyhexane-3.

7. A method of forming a polyphenylene oxide film, comprising: mixing polyphenylene oxide and a setting means for said polyphenylene oxide, wherein said setting means contains at least one polyfunctional component that is compatible with said polyphenylene oxide; allowing said setting means to crosslink; forming said mixture of polyphenylene oxide and crosslinked setting means into a film member; and hardening said film member, and wherein the polyphenylene oxide is not cross-linked.

8. The method according to claim 7, further comprising mixing an initiator with said polyphenylene oxide and said setting means and allowing said setting means and said initiator to crosslink; forming said mixture of polyphenylene oxide and cross-linked setting means and initiator into a film member; and hardening said film member.

9. The method according to claim 8, wherein said setting means is selected from the group consisting of a crosslinking monomer, a crosslinking polymer, and mixtures thereof.

10. The method according to claim 8, wherein said setting means comprises triallyl isocyanurate, triallyl cyanurate, or mixtures thereof.

11. The method according to claim 8, wherein said setting means comprises styrene copolymer and triallyl isocyanurate.

12. The method according to claim 8, wherein said initiator is 2,5-dimethyl-2,5-di-t-butyl-peroxyhexane-3.

13. A method of preparing a laminate, comprising: mixing polyphenylene oxide and a setting means for said polyphenylene oxide, wherein said setting means contains at least one polyfunctional component that is compatible with said polyphenylene oxide; allowing said setting means to crosslink; forming said mixture of polyphenylene oxide and crosslinked setting means into a film member; stacking a plurality of said film members; and integralizing said stacked film members into a laminate, and wherein the polyphenylene oxide is not cross-linked.

14. The method according to claim 13, further comprising mixing an initiator with said polyphenylene oxide and said setting means and allowing said setting means and said initiator to crosslink; forming said mixture including said initiator into a film member; stacking a plurality of said film members; and integralizing said stacked film members into a laminate.

15. The method according to claim 14, wherein said setting means is selected from the group consisting of a crosslinking monomer, a crosslinking polymer, and mixtures thereof.

16. The method according to claim 14, wherein said setting means comprises triallyl isocyanurate; triallyl cyanurate, or mixtures thereof.

17. The method according to claim 14, wherein said setting means comprises styrene copolymer and triallyl isocyanurate.

18. The method according to claim 14, wherein said initiator is 2,5-dimethyl-2,5-t-butyl-peroxyhexane-3.

19. A method of preparing an impregnated substrate, comprising: mixing polyphenylene oxide and a setting means for said polyphenylene oxide, wherein said setting means contains at least one polyfunctional component that is compatible with said polyphenylene oxide; allowing said setting means to crosslink; forming said mixture of polyphenylene oxide and crosslinked setting means into a solution; and impregnating a substrate with said solution, and wherein the polyphenylene oxide is not cross-linked.

20. The method according to claim 19, further comprising mixing an initiator with said setting means and allowing said setting means and said initiator to crosslink; forming said mixture, including said initiator, into a solution and impregnating a substrate with said solution.

21. The method according to claim 20, further comprising stacking a plurality of said impregnated substrates and integralizing said stacked impregnated substrates into a laminate.

22. The method according to claim 21, wherein said setting means is selected from the group consisting of a crosslinking monomer, a crosslinking polymer, and mixtures thereof.

23. The method according to claim 21, wherein said setting means comprises triallyl isocyanurate, triallyl cyanurate, or mixtures thereof.

24. The method according to claim 21, wherein said setting means comprises styrene copolymer and triallyl isocyanurate.

25. The method according to claim 21, wherein said initiator is 2,5-dimethyl-2,5-t-butyl-peroxyhexane-3.

26. A method of preparing a film-forming polyphenylene oxide composition, comprising: mixing polyphenylene oxide and a setting means for said polyphenylene oxide, wherein said setting means contains at least one polyfunctional component that is compatible with said polyphenylene oxide, and an inorganic filler having a relative dielectric constant of about 10; and allowing said setting means to crosslink so as to provide said composition with the ability to form a film, and wherein the polyphenylene oxide is not cross-linked.

27. The method according to claim 26, wherein said inorganic filler is selected from the group consisting of titanium dioxide ceramics, barium titanate ceramics, lead titanate ceramics, strontium titanate ceramics, calcium titanate ceramics, bismuth titanate ceramics, magnesium titanate ceramics, lead zirconate ceramics and mixtures thereof.

28. The method according to claim 27, wherein said ceramics are sintered.

29. The method according to claim 28, further comprising the addition of a plurality of said sintered ceramics.

30. The method according to claim 29, further comprising mixing an initiator with said polyphenylene oxide said setting means and said inorganic filler and allowing said setting means and said initiator to crosslink so as to provide said composition with the ability to form a film.

31. The method according to claim 30 wherein said setting means is selected from the group consisting of a crosslinking monomer, crosslinking polymer, and mixtures thereof.

32. The method according to claim 30 wherein said setting means comprises triallyl isocyanurate, triallyl cyanurate, or mixtures thereof.

33. The method according to claim 30 wherein said setting means comprises styrene copolymer and triallyl isocyanurate.

34. The method according to claim 30 wherein said initiator is 2,5-dimethyl-2,5-di-t-butyl peroxyhexane-3.

35. A method of forming a polyphenylene oxide film, comprising: mixing polyphenylene oxide a setting means for said polyphenylene oxide, wherein said setting means contains at least one polyfunctional component that is compatible with said polyphenylene oxide and an inorganic filler having a relative dielectric constant of above 10; allowing said setting means to crosslink; forming said mixture of polyphenylene oxide and crosslinked setting means into a film member; and hardening said film member, and wherein the polyphenylene oxide is not cross-linked.

36. The method according to claim 35, wherein said inorganic filler is selected from the group consisting of titanium dioxide ceramics, barium titanate ceramics, lead titanate ceramics, strontium titanate ceramics, calcium titanate ceramics, bismuth titanate ceramics, magnesium titanate ceramics, lead zirconate ceramics and mixtures thereof.

37. The method according to claim 36, wherein said ceramics are sintered.

38. The method according to claim 37, further comprising the addition of a plurality of said sintered ceramics.

39. The method according to claim 38, further comprising mixing an initiator with said polyphenylene oxide said setting means and said inorganic filler and allowing said setting means and said initiator to crosslink; forming said mixture of polyphenylene oxide, cross-linked setting means and initiator, and said inorganic filler into a film member; and hardening said film member.

40. The method according to claim 39, wherein said setting means is selected from the group consisting of a crosslinking monomer, a crosslinking polymer, and mixtures thereof.

41. The method according to claim 39, wherein said setting means comprises triallyl isocyanurate, triallyl cyanurate, or mixtures thereof.

42. The method according to claim 39, wherein said setting means comprises styrene copolymer and triallyl isocyanurate.

43. The method according to claim 42, wherein said initiator is 2,5-dimethyl-2,5-di-t-butyl-peroxyhexane-3.

44. A method of preparing a laminate, comprising: mixing polyphenylene oxide a setting means for said polyphenylene oxide, wherein said setting means contains at least one poly functional component that is compatible with said polyphenylene oxides and an inorganic filler having a relative dielectric constant of above 10; allowing said setting means to crosslink; forming said mixture of polyphenylene oxide crosslinked setting means and said inorganic filler into a film member; stacking a plurality of said film members; and integralizing said stacked film members into a laminate, and wherein the polyphenylene oxide is not cross-linked.

45. The method according to claim 44, wherein said inorganic filler is selected from the group consisting of titanium dioxide ceramics, barium titanate ceramics, lead titanate ceramics, strontium titanate ceramics, calcium titanate ceramics, bismuth titanate ceramics, magnesium titanate ceramics, lead zirconate ceramics and mixtures thereof.

46. The method according to claim 45, wherein said ceramics are sintered.

47. The method according to claim 46, further comprising the addition of a plurality of said sintered ceramics.

48. The method according to claim 47, further comprising mixing an initiator with said polyphenylene oxide said setting means and said inorganic filler and allowing said setting means and said initiator to crosslink; forming said mixture including said initiator into a film member; stacking a plurality of said film members; and integralizing said stacked film members into a laminate.

49. The method according to claim 48, wherein said setting means is selected from the group consisting of a crosslinking monomer, a crosslinking polymer, and mixtures thereof.

50. The method according to claim 48, wherein said setting means comprises triallyl isocyanurate; triallyl cyanurate, or mixtures thereof.

51. The method according to claim 48, wherein said setting means comprises styrene copolymer and triallyl isocyanurate.

52. The method according to claim 48, wherein said initiator is 2,5-dimethyl-2,5-t-butyl-peroxyhexane-3.

53. A method of preparing an impregnated substrate, comprising: mixing polyphenylene oxide a setting means for said polyphenylene oxide, wherein said setting means contains at least one polyfunctional component that is compatible with said polyphenylene oxide and an inorganic filler having relative dielectric constant above 10; allowing said setting means to crosslink; forming said mixture of polyphenylene oxide and crosslinked setting means into a solution; and impregnating a substrate with said solution, and wherein the polyphenylene oxide is not cross-linked.

54. The method according to claim 53, wherein said inorganic filler is selected from the group consisting of titanium dioxide ceramics, barium titanate ceramics, lead titanate ceramics, strontium titanate ceramics, calcium titanate ceramics, bismuth titanate ceramics, magnesium titanate ceramics, lead zirconate ceramics and mixtures thereof.

55. The method according to claim 54, wherein said ceramics are sintered.

56. The method according to claim 55, further comprising the addition of a plurality of said sintered ceramics.

57. The method according to claim 56, further comprising mixing an initiator with said setting means and said inorganic filler and allowing said setting means and said initiator to crosslink; forming said mixture, including said initiator, into a solution and impregnating a substrate with said solution.

58. The method according to claim 57, further comprising stacking a plurality of said impregnated substrates and integralizing said stacked impregnated substrates into a laminate.

59. The method according to claim 58, wherein said setting means is selected from the group consisting of a crosslinking monomer, a crosslinking polymer, and mixtures thereof.

60. The method according to claim 59, wherein said setting means comprises triallyl isocyanurate, triallyl cyanurate, or mixtures thereof.

61. The method according to claim 59, wherein said setting means comprises styrene copolymer and triallyl isocyanurate.

62. The method according to claim 59, wherein said initiator is 2,5-dimethyl-2,5-t-butyl-peroxyhexane-3.

* * * * *